United States Patent [19]
Joslin

[11] 3,849,271
[45] Nov. 19, 1974

[54] ELECTROCHEMICAL DRILLING
[75] Inventor: Frederick R. Joslin, Lebanon, Conn.
[73] Assignee: United Aircraft Corporation, East Hartford, Conn.
[22] Filed: Dec. 13, 1973
[21] Appl. No.: 424,482

Related U.S. Application Data
[63] Continuation of Ser. No. 278,135, Aug. 4, 1972, abandoned.

[52] U.S. Cl. .......................... 204/129.2, 204/224 M
[51] Int. Cl.......... B23p 1/00, B23p 1/02, B23p 1/12
[58] Field of Search...................... 204/129.2, 129.1

[56] References Cited
UNITED STATES PATENTS
3,385,947  5/1968  Inoue............................ 204/129.2 X OTHER PUBLICATIONS
Electrochemical Machining by DeBarr et al., pp. 46, 47 and 190–193, pub. by Amer. Elseview, New York, 1968.

Primary Examiner—F. C. Edmundson
Attorney, Agent, or Firm—M. P. Williams

[57] ABSTRACT

In drilling small diameter holes through workpieces by electrochemical means, a constant voltage is imposed during the drilling operation and the operation is interrupted after breakthrough when the current reaches a selected value thereby determining the configuration of the hole at the exit end.

1 Claim, 9 Drawing Figures

ELECTROCHEMICAL DRILLING

This is a continuation of application Ser. No. 278,135, filed Aug. 4, 1972, now abandoned.

BACKGROUND OF THE INVENTION

When electrochemically drilling a plurality of holes through a workpiece or workpieces of uniform thickness, the drilling operation is usually stopped when a preselected depth of movement of the drilling electrode has occurred. This is effective when there is a precise location of all the workpieces in exactly the same position or when the exit surface for the electrode is always in exactly the same position with respect to the feed of the electrode. However, differences in dimension of workpieces resulting from permitted tolerances cause the breakthrough surface not always to be at the desired location for the electrode to form the appropriate surface at the exit end of the hole being drilled. This problem is especially made difficult in drilling holes through a hollow body such as a turbine blade or vane as the tolerance buildup is doubled by the varying dimension of the outer surface of the blade on which the blade is supported during the drilling operation and the tolerance in wall thickness of the wall to be drilled.

SUMMARY OF THE INVENTION

A feature of the present invention is the termination of the drilling operation after breakthrough at a predetermined current level. It has been found that the current varies after breakthrough and that a properly shaped exit contour for the hole occurs at a predetermined current level.

According to the invention the workpiece is supported in predetermined relation to the electrode so that the latter may be moved toward and through the workpiece as it is being drilled, a predetermined fixed voltage value is imposed between the electrode and the workpiece and an electrolyte is pumped through the hollow electrode and against the workpiece with the electrochemical drilling operation continuing, the electrochemical current increasing to a peak value, then decreasing at breakthrough until a predetermined current value is indicated at which time the drilling operation is terminated.

BRIEF DESCRIPTION OF THE DRAWINGS

FIG. 5b is the shape hole resulting from a drilling operation as plotted in FIG. 5a.

FIG. 6b is a hole configuration drilled by the operation plotted in FIG. 6a.

DESCRIPTION OF THE PREFERRED EMBODIMENT

Figure 1:
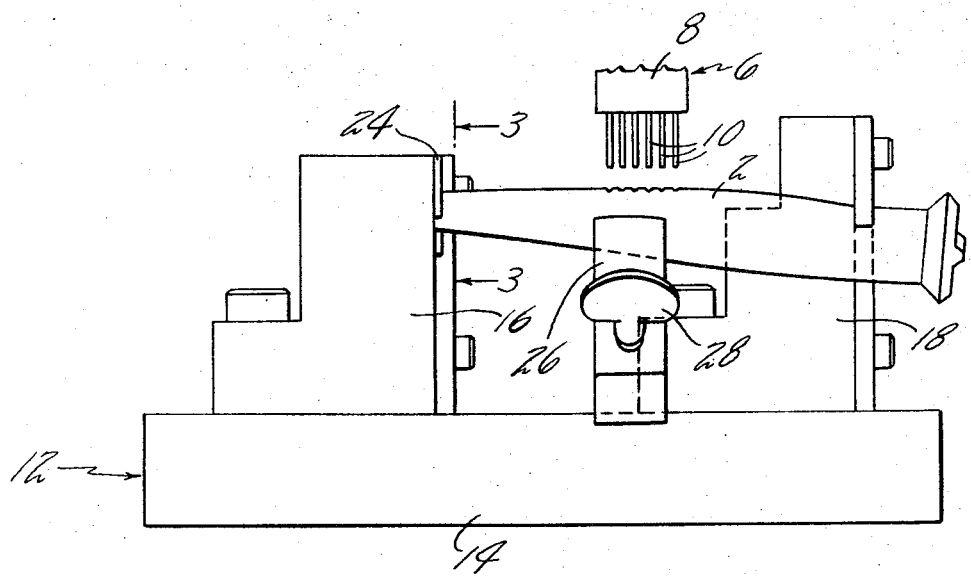
FIG. 1 is a schematic showing of an electrochemical drilling operation.
Figure 2:
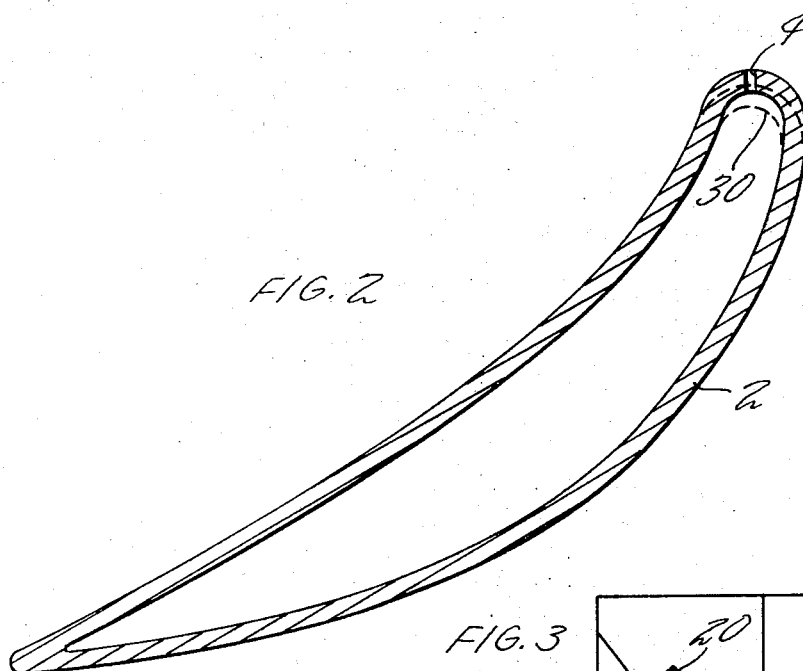
FIG. 2 is a sectional view through the workpiece showing the deviation from the normal in successive workpieces.

Referring first to FIGS. 1 and 2, the workpiece shown is an impingement tube 2 for use as an insert in a blade for a gas turbine engine. This impingement tube is airfoil shape in cross section as shown in FIG. 2 and has a plurality of cooling holes 4 formed in the leading edge by electrochemical drilling. The operation is performed by an electrode assembly 6 FIG. 1, the head 8 supporting a plurality of hollow electrodes 10. The head 8 is fed in a vertical direction to bring the electrodes toward and into the workpiece as the holes 4 are formed therein. It will be understood that an electrical potential is provided between the electrodes and the workpiece and that an electrolyte is pumped through the several electrodes against the workpiece. The tooling may be similar to that shown in the copending application of Shaw, Ser. No. 189,862 filed Oct. 18, 1971 and having a common assignee with this application.

Figure 3:
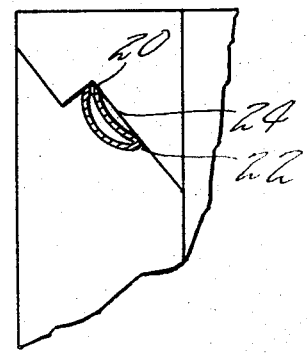
FIG. 3 is a fragmentary sectional view along line 3—3, not shown, of FIG. 1 showing the location of one end of the workpiece.

The latter is supported in a fixture 12 having a base 14 on which are mounted two locating blocks 16 and 18. Each of these blocks has two locating surfaces against which the opposite ends of the workpiece are held. The spaced workpiece engaging surfaces on block 16 are shown in FIG. 3 as the spaced points 20 and 22 on a plate 24, FIG. 1, attached to the block 16.

The impingement tube is held against the four locating surfaces by a clamp 26 which engages the side of the impingement tube and is held in position by a suitable clamping screw 28. The impingement tube is manufactured to certain dimensions and those dimensions have tolerances thereon as is customary. The tolerance buildup may be such that the leading edge of the impingement tube is not always in the same location and may be as far out of the approved or accepted position as the extent of the deviation represented by the dotted lines 30 in FIG. 2. That is to say, the portion of the tube where the holes are to be drilled is not always in precisely the same relationship to the electrodes or in fact to the base of the machine with respect to which the electrodes are fed into the impingement tube. Thus, in drilling the holes with the electrodes 10 if the set of electrodes is stopped in the same predetermined point at the end of each drilling operation, the hole will not necessarily be finished in some cases or in other cases the electrode may have progressed through the workpiece and be fed beyond the necessary position for drilling the desired hole. The dimension of the impingement tube is such that it is difficult to determine precisely the location of the successive impingement tubes when they are mounted in the fixture and located as shown and it therefore becomes necessary to interrupt the electrochemical drilling operation by some device that determines the actual relation of the electrode to the inner surface of the workpiece itself, that is to say, the location of the inner end of the hole being drilled by the electrode.

Figure 4A:
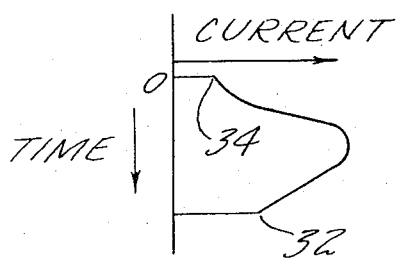
FIG. 4a is a plot of drilling time against electrical current for drilling a hole of the type shown in FIG. 4b.
Figure 4B:
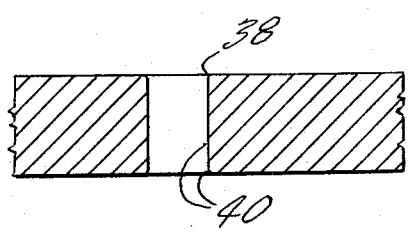
FIG. 4b is a fragmentary sectional view showing the desired type of electrochemically drilled hole.

In accordance with the present invention, it has been found that interruption of the drilling operation at a predetermined current value in the electrical potential applied between the electrodes and the workpiece will permit the proper interruption of the drilling operation so that the electrode is in a predetermined relation to the inner end of the hole and the hole will be formed to the desired shape. Referring now to FIGS. 4, 5 and 6, the configuration of the hole in FIG. 4b is a result of termination of the drilling operation when the current reaches a selected value 32 FIG. 4a. During the electrochemical drilling operation the current starts at a value 34 and gradually builds up to a peak and then after the electrodes break through on the inner end of the holes, the current reaches the value 32. It has been found that at this particular value the resulting hole shape is substantially cylindrical as shown in FIG. 4b and has rounded ends both at the outer end 38 and at the inner end 40 of the hole.

Figure 5A:
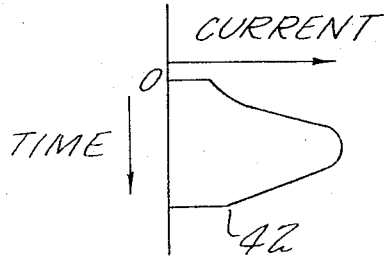
FIG. 5a is a plot of drilling time against current where the drilling operation is not interrupted until a hole of the shape of FIG. 5b is formed.
Figure 5B:
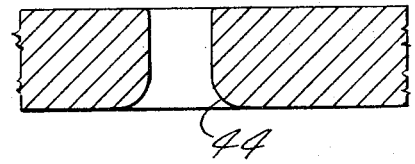
Figure 6A:
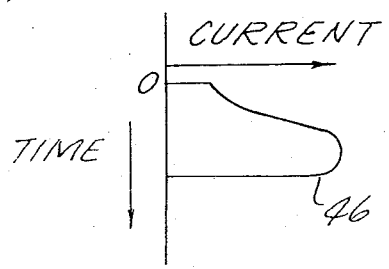
FIG. 6a is a plot of current against time in drilling the hole of the shape shown in FIG. 6b.
Figure 6B:
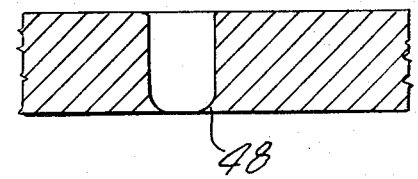

If the operation is allowed to continue until a lower current value is reached as represented by the point 42 in FIG. 5a, the hole will be excessively bell-mouthed at the inner end as shown at 44 FIG. 5b. On the contrary, if the drilling operation is interrupted at a relatively large current value as represented by the point 46 in FIG. 6a, the inner end of the hole will not be finished to the desired diameter and will have an inwardly projecting rim 48 thereon as shown in FIG. 6b. The point of breakthrough of the electrodes is represented by a particular point in the plot of current against time as will be apparent. Breakthrough is indicated when the current starts to fall after it peaks.

In drilling the several holes represented by the showing of FIGS. 1 and 2, the thickness of the wall to be drilled is from 0.010 inches to 0.013 inches and the diameter of the hole to be drilled is 0.036 inches. At the start of the operation, the voltage applied is 12.5 volts and the current between the workpiece and the electrodes at the start of the operation is 1.0 amps. The operation continues to a peak of about 10 amps, and the cutoff point in this particular operation was 4.0 amps. This produced a hole of the configuration shown in FIG. 4b. The electrolyte used was sodium chloride 2.25 lbs./gal. with sodium hydroxide added to a pH of about 10. The operation terminates when the electrode projects 0.005 inches beyond the inner wall. The feed rate for the electrodes was 0.150 inches per minute and the starting gap varied from 0.005 to 0.015 depending on the tolerance buildup. The cathode pressure was 55 psi.

If the operation were terminated sooner as in FIG. 6 at an amperage of 8 amps, the hole had the contour shown in FIG. 6b. If the operation was allowed to continue until the amperage reached 2 amps as in FIG. 5a, the hole became bell-mouth as in FIG. 5b.

It was found that in electrochemically drilling successive workpieces, the particular vertical location of the portion of the impingement tube through which the holes will be made did not affect the configuration of the holes drilled so long as the operation was stopped at the amperage found empirically to be suitable for making holes the shape of those in FIG. 4b. Accordingly, the automatic interruption of the drilling operation at a predetermined amperage makes possible the production of uniformly sized and configured holes in successive workpieces in spite of the tolerance changes that affect the position of the workpiece with respect to the head that carries the electrodes.

It should be noted that this process relates to production drilling, and that the empirical determination, by trial and error on a few workpieces, of the predetermined value at which operations are to be terminated comprises an insignificant amount of preparation in that the same current value can thereafter be used for drilling any number of workpieces of the same general type, such as the impingement tubes 2 referred to with respect to FIGS. 1 and 2 hereinbefore.

I claim:

1. In the electrochemical drilling of a hole completely through a workpiece, the steps of:
positioning a hollow electrode adjacent to a workpiece;
flowing an electrolyte through the electrode and against the workpiece;
applying a constant electrical voltage between the electrode and the workpiece across the electrolyte;
advancing the electrode at a constant rate toward the workpiece for the drilling of the hole while maintaining the electrolyte flow and voltage substantially constant;
measuring the magnitude of electric current flow between the electrode and the workpiece through the electrolyte as the electrode is advanced toward the workpiece and drilling proceeds, the electric current first increasing as the drilling proceeds until electric current reaches a maximum value at initial perforation, and thereafter decreasing as drilling proceeds until it reaches a predetermined value corresponding to the point of advancement of the electrode at which a uniform hole is completed through the workpiece; and automatically terminating the drilling operation when the electric current reaches said predetermined current value.

* * * * *